Patented May 4, 1937

2,079,483

UNITED STATES PATENT OFFICE 2,079,483

WELDING ROD

Irving T. Bennett, Rome, N. Y., assignor to Revere Copper and Brass Incorporated, Rome, N. Y., a corporation of Maryland No Drawing. Application April 17, 1935, Serial No. 16,816

3 Claims. (Cl. 219—8)

My invention relates to conditioning metal parts by building them up and shaping them as, for example, reconditioning worn locomotive axles, bearings, bushings, hub-liners, and the like, and to weld metal for such uses.

Heretofore, it has been proposed to recondition worn parts by depositing thereon so-called "weld metal" by employing a welding rod and any suitable process effective progressively to melt the end portion of the rod and fuse the molten metal to the part, and, after the part is gradually built up in this way and cooled, to machine it to the desired shape and size.

In the attempt to condition metal parts in this way it has been found that known metals suitable for welding are difficult to machine, especially after being subjected to the welding operation for building up the part. Further, it has been found that weld metals heretofore proposed have the defect of presenting poor bearing metals due to the tendency of the bearing made of them to "seize" or "grab" as it is commonly termed.

Applicant has found, that by suitably incorporating uncombined lead into the metal of which the part is built up, the same may be readily machined, although such metal containing lead it has been found would be unsuitable for ordinary welding purposes because lead would act to weaken the strength of the welded joint uniting the parts welded together. Further, the uncombined lead it has been found acts to prevent so-called "seizing" or "grabbing" in the bearing, probably because its action is in the nature of a lubricant.

In the practice of the invention, the base metal of which the worn part is built up is such that it will not alloy with lead, in order that the lead may exist as minute globules distributed throughout the metal. Copper and certain high copper content alloys it has been found are admirably suited for this purpose because lead alloys with them with difficulty, if at all. The built up part therefore according to the invention consists of copper or a copper-base alloy with which is mechanically mixed, as distinguished from alloyed, a relatively small percentage of lead which is distributed throughout the metal. Satisfactory results will ordinarily be secured with appreciable amounts of lead up to about 5 or 6%, although for some uses the amount of lead may be advantageously increased up to about 15%.

It is possible to make the welding rod by introducing lead into the melt and casting the rod, or after casting the billet cold rolling it to the desired size and shape to form the rod. Copper alloys containing lead it has been found ordinarily are "hot short", that is to say, they cannot be hot rolled or otherwise worked hot. Conveniently, therefore, the welding rod may consist of copper or a copper-base alloy which can be hot worked and has the lead mechanically associated with it in some way other than by introducing the lead into the melt of which the rod material is formed. Preferably this is done by hot working a lead-free copper or copper-base alloy into rods, or it may be done by hot rolling the metal into sheets, say about ⅜" thick, and shearing the sheets to form rods of approximately square cross-section, the opposite sides being left rough as the result of the shearing operations. The rod however formed may be built up to form a composite rod by coating it with lead by dipping it into molten lead or spraying it with it, the roughened surfaces of the rod when sheared causing a greater amount of lead to adhere than would otherwise be the case. For a rod of given weight, a square or other polygonal cross-section of the rod it will be understood provides a greater surface area for adherence of the lead than would be the case if the rod were circular in cross-section.

It will also be understood that the lead may be associated with the copper or copper-base alloy in other ways as, for example, by employing tubing with a lead filler, or by wrapping the rod with lead tape, or by drawing or extruding a lead tube over the rod, or by electro-depositing a coating of lead upon the rod, or by any of the known methods of building up composite rods. It is also possible to coat a copper rod, or one formed of a copper-base alloy, with separate layers of lead and tin, or with a lead-tin or other lead-base alloy, and upon melting of the rod the tin, or other non-lead constituents, will dissolve in the copper or copper-base while the lead will be distributed through the mass as a mechanical mixture with it. It will be understood that the amounts of lead and tin employed in these examples will be such as to incorporate into the metal deposited on the metal part the percentages of lead and tin herein elsewhere specified, and that in this way additional lead and tin may be added to the alloy or mixture of which the body of the rod is formed, when said alloy or mixture already contains these metals.

The operation of building up the worn part by use of the above described welding rods is performed by use of the so-called "carbon arc" process, although, if desired, it may be performed by use of the so-called "electric metallic arc" process. When the rods contain the lead either in the form of a coating or as a dispersion a very fine dispersion of lead in the deposited metal is secured, in fact a much finer dispersion than could be accomplished by a casting operation, that is to say, even though the lead is dispersed in a cast welding rod by adding the lead to the melt, the lead will be more finely dispersed and more uniformly distributed in the weld metal when the deposition is caused by an electric arc.

Preferably, but not necessarily, and without limitation thereto, the copper is in the form of a copper-base alloy containing silicon, silicon acting to secure an excellent dispersion of the lead through the metal of the built up part. Such an alloy may consist of 2 to 4.7% silicon, at least 0.1% tin throughout this range of silicon, with the balance approximately all copper. The maximum amount of tin for any value of silicon up to 3% may be as high as 2% and should not exceed this value, while when the silicon is above approximately 3% the maximum amount of tin should vary between approximately 0.9 and 2% inversely and linearly with the amount of silicon, that is to say, when the silicon is 3 and 4.7% the maximum amount of tin should not exceed approximately 2 and 0.9% respectively and between these values of silicon the maximum amount of tin should decrease uniformly with the increase in the amount of silicon. If desired, however, the silicon may be as low as 0.01% throughout the entire range of tin. Appreciable amounts up to 0.5% zinc, or in any event preferably not more than 1% zinc, may be incorporated into the alloy for improving its working qualities, and, if desired, a small amount of phosphorus may be incorporated for improving the welding properties of the rod. Appreciable results will be obtained with as low as 0.005% phosphorus, and preferably the phosphorus should not exceed 0.1% with the higher amounts of silicon and tin and 0.25% with the lower amounts of silicon and tin, lest it render the metal "hot short". A satisfactory specific example of this metal is silicon 3.5%, tin 0.5%, balance copper, and, if desired, either or both 0.05% phosphorus and 0.25% zinc substituted for part of the copper. Such metal has great ductility and high strength. It works freely both hot and cold, and has excellent resistance to corrosion. It also machines freely, and presents a good bearing surface.

If desired, the copper-base alloy may consist of binary silicon-bronze, with or without small amounts of zinc or phosphorus, or both, within the ranges of zinc and phosphorus above specified. Bronzes of this group containing 0.1 to 5% silicon will give satisfactory results. If the alloys are cast the phosphorus may be as high as 10%.

Other copper-base alloys as, for example, binary tin-bronzes may be employed. Preferably the amount of tin is about 10%, but lower values, say down to 1%, and higher values, say up to 12%, will give fairly satisfactory results. Phosphorus may also be added to these alloys, preferably not more than 0.05%. However, if desired, the phosphorus may run up to 1%. An example of a suitable alloy of this group is 10% tin, 0.12% phosphorus, balance copper.

A binary copper-phosphorus welding rod may also be employed for the copper-base alloy as, for example, copper rods containing 6 to 10% phosphorus.

The tin may be omitted, if desired, from the hereinbefore described alloys of which the body of the rod is formed, and may be placed in the coating of the rod, as above described, so that the tin will alloy with the copper-base when the rod is melted.

It will be understood that within the scope of the appended claims wide deviations may be made from the above described welding rods and copper-base alloys without departing from the spirit of the invention.

I claim:

1. A composite welding rod built up of at least two elements in definite juxtaposed substantially segregated relation substantially uniformly distributed linearly of the rod, one of which elements is predominantly of tin-free copper, or tin-free copper-base alloy, or copper-base alloy containing tin, the element in each instance containing dispersed lead, the other element being predominantly material of the group comprising lead, tin, and tin-lead alloy, the rod always presenting appreciable amounts up to 12% tin, and the lead being present in appreciable amounts up to 15%.

2. A welding rod according to claim 1 in which the material of said group is contained in a coating upon a rod-like body of the other element.

3. A welding rod according to claim 1 in which the material of said group is in the form of a coating of tin-lead alloy upon a rod-like body of copper or copper-base alloy containing dispersed lead.

IRVING T. BENNETT.